United States Patent
Chen

(10) Patent No.: US 10,785,758 B2
(45) Date of Patent: Sep. 22, 2020

(54) RECEPTION OF DOWNLINK DATA FOR COORDINATED MULTI-POINT TRANSMISSION IN THE EVENT OF FALL-BACK

(71) Applicant: TEXAS INSTRUMENTS INCORPORATED, Dallas, TX (US)

(72) Inventor: Runhua Chen, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/070,835

(22) Filed: Mar. 15, 2016

(65) Prior Publication Data
US 2016/0198443 A1 Jul. 7, 2016

Related U.S. Application Data

(63) Continuation of application No. 13/970,546, filed on Aug. 19, 2013.
(Continued)

(51) Int. Cl.
*H04W 72/04* (2009.01)
*H04W 76/27* (2018.01)
(Continued)

(52) U.S. Cl.
CPC .......... *H04W 72/042* (2013.01); *H04B 7/024* (2013.01); *H04L 1/0046* (2013.01);
(Continued)

(58) Field of Classification Search
None
See application file for complete search history.

(56) References Cited

U.S. PATENT DOCUMENTS

2010/0322178 A1 12/2010 Li et al.
2011/0032839 A1 2/2011 Chen et al.
(Continued)

FOREIGN PATENT DOCUMENTS

| CN | 101931485 | 12/2010 |
|----|-----------|---------|
| JP | 2012531810 | 12/2012 |
| WO | WO2014022209 A1 | 2/2014 |

OTHER PUBLICATIONS

NTT Docomo, "Views on Synchronized New Carrier", 3GPP TSG RAN WG1 Meeting #68bis, R1-121460, Jeju, Korea, Mar. 26-30, 2012, 2 pages.
(Continued)

*Primary Examiner* — Jason E Mattis
*Assistant Examiner* — Hong Shao
(74) *Attorney, Agent, or Firm* — Gregory J. Albin; Charles A. Brill; Frank D. Cimino

(57) ABSTRACT

Systems and methods for fall-back rate-matching and timing for user equipment (UE) configured for downlink (DL) Coordinated Multi-Point Transmission (CoMP) are disclosed. In one embodiment, when a UE configured in DL CoMP receives a fall-back transmission, PDSCH is rate-matched around the serving cell CRS. In an alternative embodiment, when a UE configured in DL CoMP receives a fall-back transmission, PDSCH is rate-matched or uses timing around one of the cell-specific reference symbol (CRS) resource element (RE) set indicated by RRC-higher layer signaling. For example, PDSCH may be rate-matched or use timing around the first RRC higher layer configured CRS RE set.

2 Claims, 3 Drawing Sheets

Related U.S. Application Data

(60) Provisional application No. 61/693,854, filed on Aug. 28, 2012.

(51) Int. Cl.
  *H04B 7/024* (2017.01)
  *H04W 72/12* (2009.01)
  *H04W 72/08* (2009.01)
  *H04L 1/00* (2006.01)
  *H04W 28/22* (2009.01)

(52) U.S. Cl.
  CPC ..... *H04W 72/085* (2013.01); *H04W 72/1226* (2013.01); *H04W 76/27* (2018.02); *H04W 28/22* (2013.01)

(56) References Cited

U.S. PATENT DOCUMENTS

| | | |
|---|---|---|
| 2011/0038310 A1 | 2/2011 | Chmiel et al. |
| 2011/0149894 A1 | 6/2011 | Luo et al. |
| 2012/0113917 A1 | 5/2012 | Gaal et al. |
| 2012/0176884 A1* | 7/2012 | Zhang .................. H04B 7/024 |
| | | 370/203 |
| 2012/0178456 A1 | 7/2012 | Peisa et al. |
| 2013/0039291 A1 | 2/2013 | Blankenship et al. |
| 2013/0208604 A1* | 8/2013 | Lee .................. H04L 25/0226 |
| | | 370/252 |
| 2013/0279361 A1* | 10/2013 | Seo .................. H04J 11/0053 |
| | | 370/252 |
| 2014/0016714 A1* | 1/2014 | Chen .................. H04B 7/024 |
| | | 375/260 |
| 2015/0181570 A1* | 6/2015 | Sorrentino .......... H04W 72/1205 |
| | | 370/329 |

OTHER PUBLICATIONS

Renesas Mobile Europe Ltd., "Signaling of CRS Position Information [online]", 3GPP TSG-RAN WG1#70 R1-123582, Aug. 13, 2012; URL:http://www.3gpp.org/ftp/tsg_ran/WG1_RL1/TSGR1_70/Docs/R1-123582.zip (4 pages).

NEC Group, "On PDSCH RE mapping in CoMP [online]", 3GPP TSG-RAN WG1#70 R1-123248, Aug. 13, 2012 URL:http://www.3gpp.org/ftp/tsg_ran/WG1_RL1/TSGR1_70/Docs/R1-123248.zip (7 pages).

Fujitsu, "Discussion on PDSCH RE mapping [online]", 3GPP TSG-RAN WG1#70 R1-123301, Aug. 13, 2012 URL:http://www.3gpp.org/ftp/tsg_ran/WG1_RL1/TSGR1_70/Docs/R1-123301.zip (4 pages).

* cited by examiner

RECEPTION OF DOWNLINK DATA FOR COORDINATED MULTI-POINT TRANSMISSION IN THE EVENT OF FALL-BACK

CROSS-REFERENCE TO RELATED APPLICATIONS

The present application is a Continuation of application Ser. No. 13/970,546 filed Aug. 19, 2013, which claims the benefit of the filing date of U.S. provisional patent application No. 61/693,854, filed Aug. 28, 2012, the disclosure of which is hereby incorporated by reference.

BACKGROUND

A LTE wireless network consists of multiple base stations. Each base station, such as an Evolved Node B (eNodeB or eNB), may be configured as a single cell with its own cell ID and assigned to cover a specific serving area. In a conventional wireless network, mobile terminals or User Equipment (UE) are always connected to and receive uplink (UL) and downlink (DL) data from one connected cell, with single-cell transmission/reception. In the downlink, transmissions from other base stations generate inter-cell interference to the UB. In the uplink, the UE's transmissions to its serving cell generate inter-cell interference to other cells or base stations.

SUMMARY OF THE INVENTION

For DL Coordinated Multi-Point Transmission (CoMP), the transmission point (e.g., cell) transmitting downlink data may switch dynamically on a per-subframe basis. Because different cells may have different Cell-Specific Reference Symbols (CRS) (e.g., different antenna port numbers, frequency shifts), it is necessary to signal the CRS pattern around which the UE may assume Physical Downlink Shared Channel (PDSCH) rate matching. An n-bit information field can be included in the Downlink Control Information (DCI) format for DL CoMP scheduling. Each codepoint corresponds to a Radio Resource Control (RRC) higher layer configured CRS Resource Element (RE) set, around which PDSCH is rate-matched.

Fall-back operation is needed for all cellular systems in which an eNB uses a compact DCI format (e.g., DCI 1A) to perform data scheduling. When a CoMP UE receives fall-back scheduling on DCI 1A, the UE needs to know the CRS REs for PDSCH rate-matching.

In one embodiment, when a UE configured in DL CoMP receives a fall-back transmission, PDSCH is rate-matched around the serving cell CRS.

In an alternative embodiment, when a UE configured in DL CoMP receives a fall-back transmission, PDSCH is rate-matched around one of the CRS REs indicated by RRC-higher layer signaling. For example, PDSCH may be rate-matched around the first RRC higher layer configured CRS RE set.

BRIEF DESCRIPTION OF THE DRAWINGS

Figure 1:
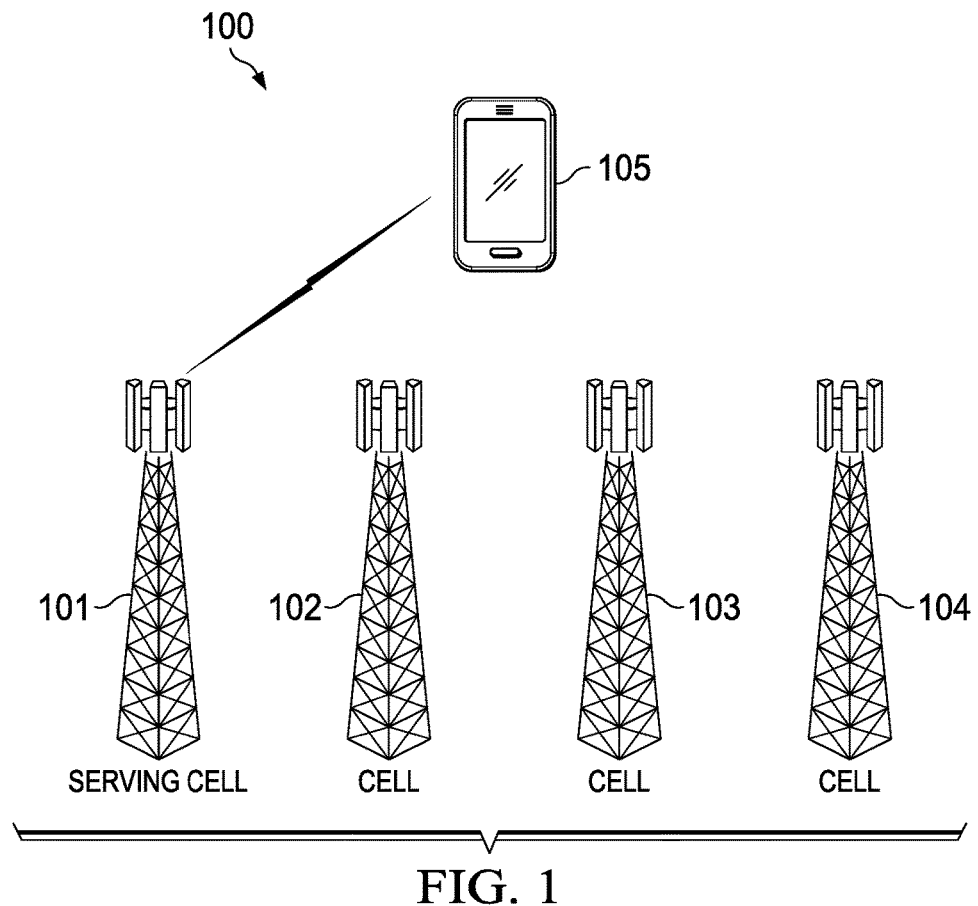

Having thus described the invention in general terms, reference will now be made to the accompanying drawings, wherein:

FIG. 1 is a block diagram illustrating a wireless network according to one embodiment.

Figure 2A:
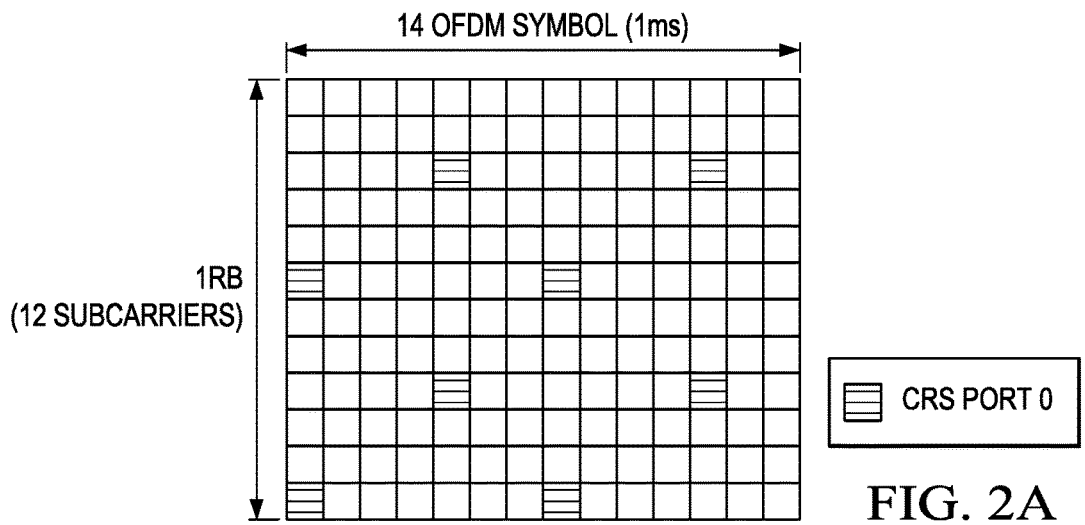
Figure 2B:
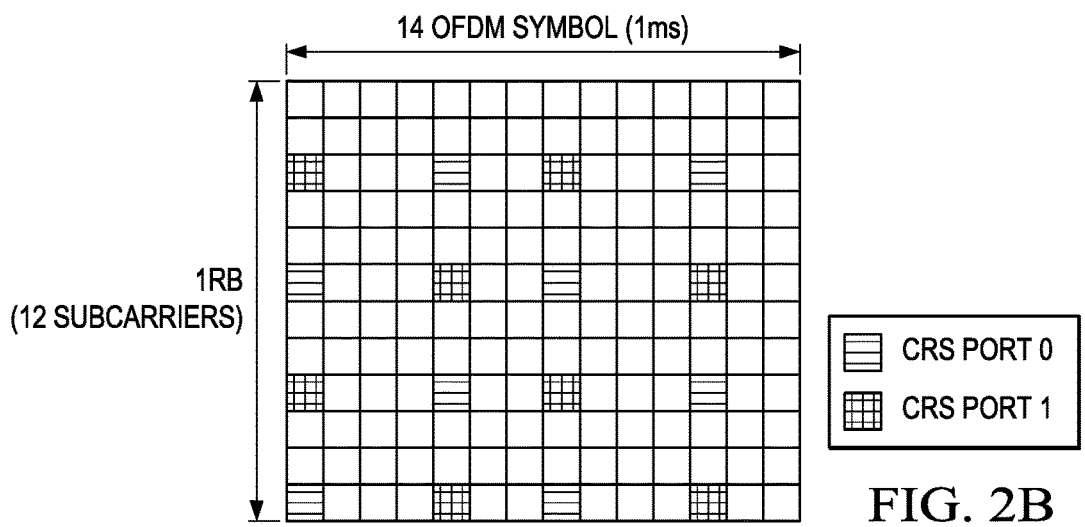
Figure 2C:
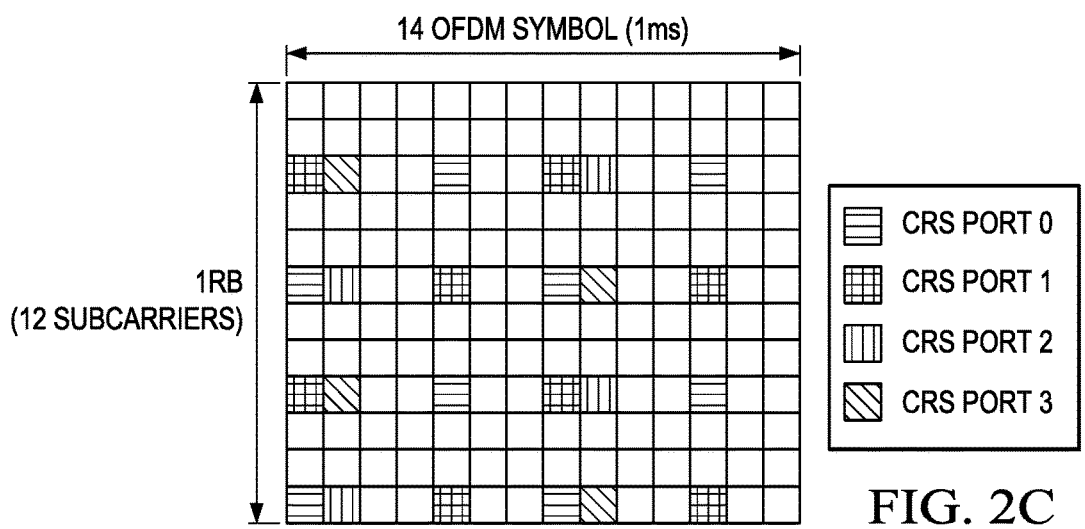

FIGS. 2A-C are diagrams of single-cell CRS patterns used in various embodiments.

Figure 3:
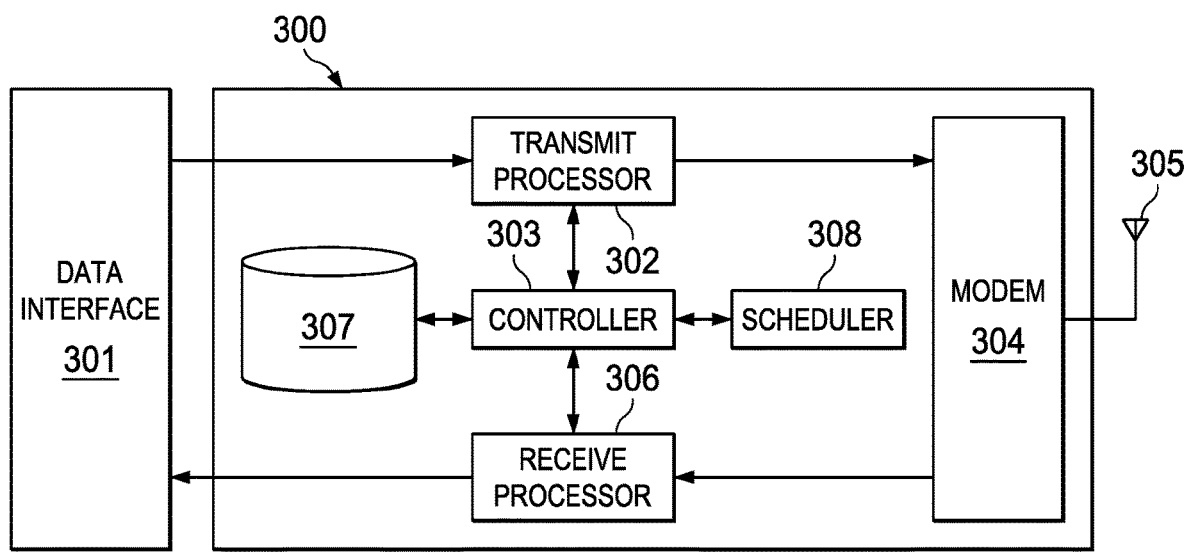

FIG. 3 is a high level block diagram of a system that may be used as an eNB or UE in various embodiments.

Figure 4:
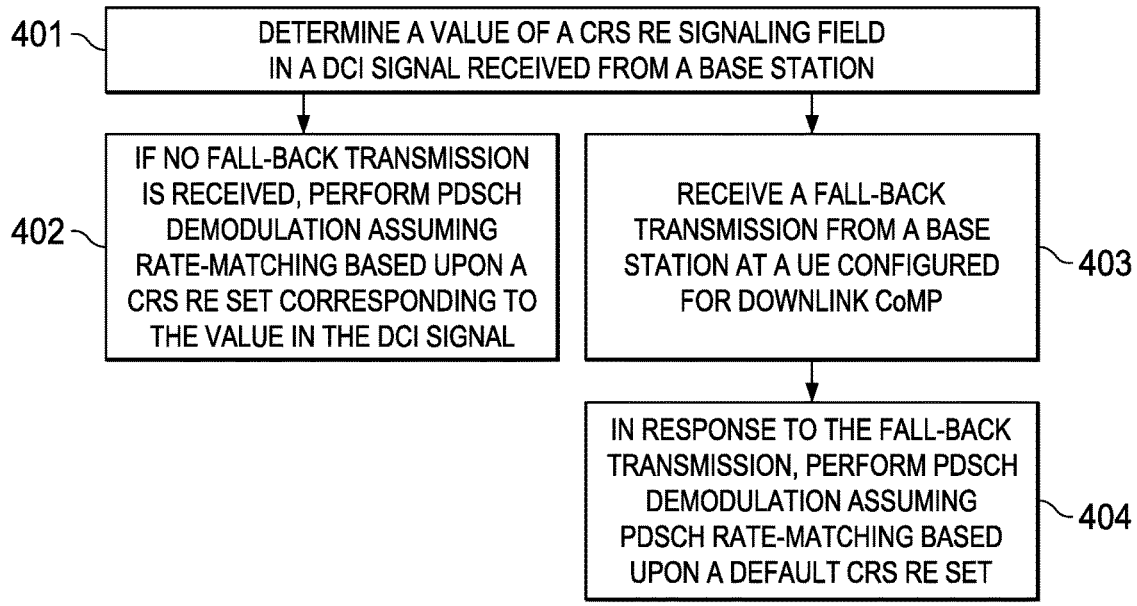

FIG. 4 is a flowchart illustrating a method for determining PDSCH rate-matching according to one embodiment.

Figure 5:
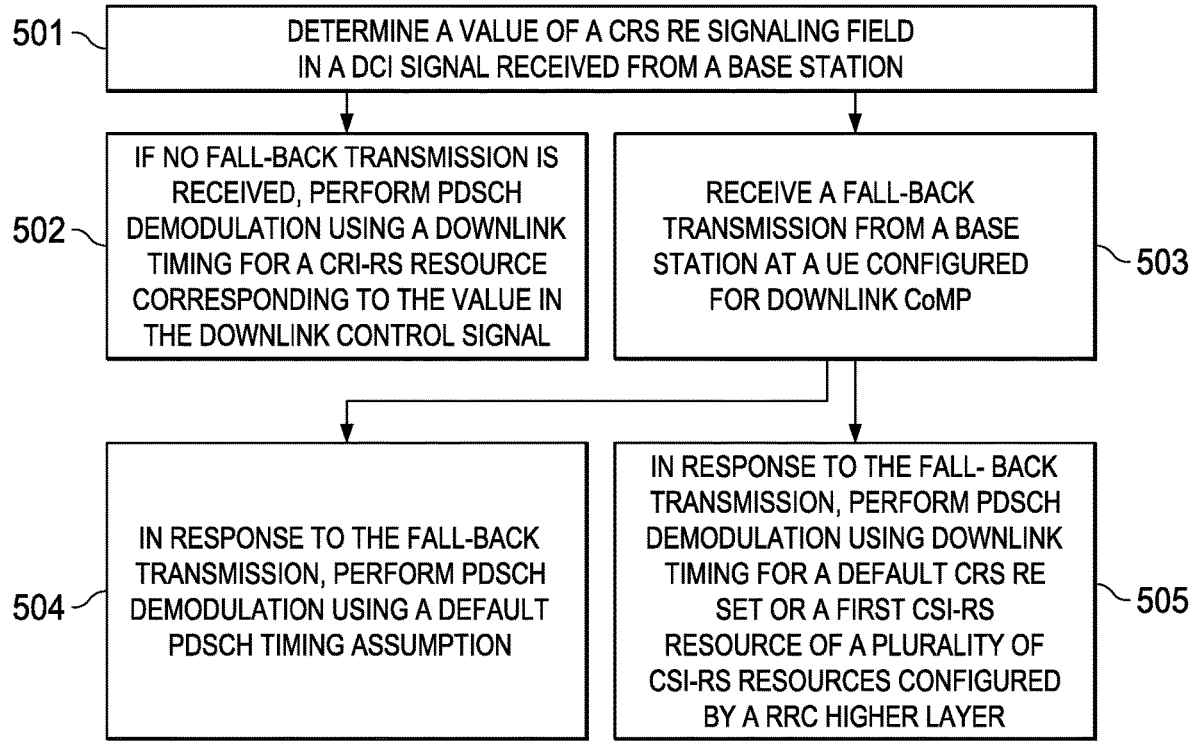

FIG. 5 is a flowchart illustrating a method for determining PDSCH timing according to another embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Coordinated Multi-Point Transmission (CoMP) is used to send and receive data to and from a UE and multiple transmission points. The transmission points may include, for example, an eNodeB configured as a cell, macro cell, pico cell, femto cell, remote radio head, distributed antennas, other wireless transmission entity, or a combination thereof. The transmission points coordinate with each other to jointly optimize the downlink beamforming signals, including the beamforming vectors, transmission power, and/or scheduling decisions. Unlike traditional wireless networks in which signals from other transmission points create co-channel interference, coordination between multiple transmission points allow the signals to be cooperatively designed to reduce co-channel interference, boost received signal-to-noise ratio (SNR), increase cell-average throughput, and improve cell-edge coverage.

The following types of CoMP transmission schemes are possible.

Joint Transmission (JT) allows simultaneous data transmission from multiple points to a single UE or multiple Ups in a time-frequency resource. Data to a UE is simultaneously transmitted from multiple points. The data may be coherently or non-coherently transmitted to improve the received signal quality and/or data throughput and/or cancel actively interference for other UEs.

Dynamic Point Selection (DPS) allows data transmission from one point at each time instance. The actual transmitting point may change from one subframe to another. Data is available simultaneously at multiple points.

Mapping of Downlink Data in Presence of Reference Signals.

FIG. 1 is a block diagram illustrating a wireless network 100, which may be an LTE network that utilizes Orthogonal Frequency-Division Multiple Access (OFDMA) on the downlink and Single-Carrier Frequency Division Multiple Access (SC-FDMA) on the uplink. LTE partitions system bandwidth into multiple orthogonal subcarriers, which may be referred to as frequency tones or frequency bins. Each subcarrier may be modulated with data, control, or reference signals. The wireless network 100 includes a number of eNBs 101-104 and other network entities. The eNBs 101-104 communicate with a UE 105. Each eNB 101-104 provides communication services for a particular geographic area or "cell".

UE 105 may be stationary or mobile and may be located throughout the wireless network 100. UE 105 may be referred to as a terminal, a mobile station, a subscriber unit, a station, such as a mobile telephone, a personal digital assistant (PDA), a wireless modem, a laptop or notebook computer, a tablet, and the like. A UE 105 may communicate with more than one eNB 101-104. One eNB 101 will be the primary cell (PCell) and the other eNBs 102-104 will be secondary serving cells (SCell).

Reference signals are essential for the operation of wireless network 100. A wireless network necessarily has different types of reference signals, which are usually transmitted with data simultaneously from base stations 101-104. For example, the LTE downlink system includes primary synchronization signals (PSS) and secondary reference signals (SSS), cell-specific reference signals (CRS), channel state information reference signal (CSI-RS), and demodulation reference signals (DMRS).

PSS/SSS are cell-specific and enable a UE 105 to perform cell search and initial synchronization. When UE 105 powers up, it blindly detects the PSS/SSS of several cells 101-104, and connects to the strongest cell 101 with the highest signal strength. The connected cell 101 is identified by UE 105 as the "serving cell" and provides all essential system information to maintain connection to the wireless network 100. The cell ID of the serving cell 101 is derived by UE 105 as a function of the PSS/SSS. The PSS/SSS also provides the initial timing synchronization so that UE 105 understands the time domain starting position of each subframe.

CRS are cell-specific, non-precoded, and allows UE 105 to continuously track the downlink timing. In an LTE system, {1, 2, 4} CRS antenna ports can be configured by a base station, and the time/frequency resource elements (RE) occupied by CRS antenna ports are determined by the number of CRS antenna ports. Resource element is the minimum time-frequency unit in LTE which corresponds to one OFDM subcarrier in one OFDM symbol. In the time domain, each subframe is of 1 ms duration and comprises 14 OFDM symbols. In the frequency domain, one subframe comprises N resource blocks where each resource block consists of 12 OFDM subcarriers. N is a function of the system bandwidth, e.g., N=6/15/25/50/100 for 1.4/3/5/10/20 MHz system bandwidth. The CRS of each cell 101-104 is also shifted in the frequency domain in order to achieve inter-cell randomization, where the frequency shift is a function of the cell ID. Note that an eNodeB 101-104 may configure up to 6 Multicast-Broadcast Single Frequency Network (MBSFN) subframes out of every 10 subframes, where no CRS are transmitted in the MBSFN sub frames.

CSI-RS are a set of non-precoded signals on which UE 105 performs channel state information measurement and feedback. In LTE, the UE 105 does not directly feed-back the wireless channel, but feeds back a set of recommended Multiple-Input/Multiple-Output (MIMO) transmission properties including rank indicator, precoding matrix indicator, channel quality indicator. Rank indicator (RI) is the number of data streams that UE 105 can reliably receive. A precoding matrix indicator (PMI) corresponds to a precoding vector that the UE 105 recommends for downlink precoding. A channel quality indicator (CQI) reflects the channel quality/strength, and is often quantized as the signal-to-noise ratio (SNR), or size of the transport block recommended for downlink transmission.

DMRS are UE-specific, precoded by the same precoder as data, and transmitted only in the frequency blocks in which UE 105 receives data transmission. DMRS enables UE 105 to directly measure precoding channel without knowing the precoding vector.

In legacy LTE single-cell transmission (e.g., LTE Rel. 8-10), downlink data transmission is initiated from a single serving cell 101. To correctly receive data transmission, UE 105 only needs to take into account the RS pattern of the serving cell. More specifically, PDSCH data is rate-matched around the CRS and is not mapped to any resource elements occupied by the CRS of the serving cell 101.

FIGS. 2A-C are diagrams of single-cell CRS patterns. FIG. 2A is for 1 port CRS. FIG. 2B is for 2 port CRS. FIG. 2C is for 4 port CRS. Different cells may be configured with different numbers of CRS antenna ports. In addition, the CRS of a cell may be shifted by $CRS_{shift}=\text{mod}(PCI, 6)$ subcarriers in the frequency domain, where PCI is the Physical Cell ID.

For CoMP operation, the LTE network 100 configures multiple (N) CSI-RS resources, where each CSI-RS resource corresponds to a transmission point 101-104. UE 105 measures the per-point channel of each transmission point 101-104 using the corresponding CSI-RS resource. However the UE 105 may not necessarily need to know the association between each CSI-RS resource and a transmission point. The N CSI-RS recourses are defined as the CoMP measurement set.

Mapping of Downlink Data in Presence of Reference Signals for CoMP.

For DL CoMP, the transmission points 101-104 transmitting downlink data may switch dynamically on a per-subframe basis. Because different cells 101-104 may have different CRS patterns (e.g., number of antenna ports, frequency shift), it is necessary to signal the CRS pattern around which a UE 105 may assume PDSCH rate matching. For that, an n-bit information field can be included in downlink control signal or downlink control indicator (DCI) format dedicated for DL CoMP scheduling. Each codepoint of the n-bit information field corresponds to a RRC higher layer configured CRS RE set, around which PDSCH is rate-matched. For example, in one embodiment, the RRC higher layer may configure four possible CRS RE sets. Each CRS RE set comprises of a set of CRS resource elements that may be associated to one or a set of transmission points 101-104 in CoMP transmission.

A two-bit signaling field in the dynamic DCI format for CoMP scheduling may be used to dynamically signal one of the four CRS RE sets for PDSCH rate-matching. Each CRS RE set may not correspond to a single-cell CRS pattern. If a CRS RE set corresponds to the combination of multiple single-cell CRS patterns, the CRS RE set can be used for joint transmission from multiple cells. An example of the two-bit CRS signaling field and associated UE assumption is given in Table 1.

TABLE 1

| CRS RE signaling field in DCI format | UE assumption on PDSCH rate-matching |
| --- | --- |
| 00 | PDSCH rate-matching around the $1^{st}$ set of CRS REs configured by higher layer |
| 01 | PDSCH rate-matching around the $2^{nd}$ set of CRS REs configured by higher layer |
| 10 | PDSCH rate-matching around the $3^{rd}$ set of CRS REs configured by higher layer |
| 11 | PDSCH rate-matching around the $4^{th}$ set of CRS REs configured by higher layer |

After the UE 105 successfully establishes connection to the network 100, the serving cell 101 configures the UE in a specific downlink transmission mode. In every radio subframe the UE 105 monitors a dedicated DCI format associated with the configured DL transmission mode; if such a DCI format is found, the UE proceeds to decode PDSCH downlink data according to control information carried by the DCI. In addition, in every subframe UE 105 also needs to monitor a fall-back DCI format 1A; if fall-back DCI format 1A is found by the UE 105, UE decodes downlink PDSCH data using control information carried by DCI 1A. Fall-back operation is critical for all cellular systems. During fall-back, the base station 101 uses a compact DCI format (e.g., DCI 1A) to schedule downlink transmission to UE 105. Data transmission falls back to a single-layer transmit diversity (TxD)-based transmission. Fall-back may be performed for the following reasons.

The DCI format used for fall-back scheduling has a smaller size and better coverage than the dedicated DCI format associated with the configured downlink transmission mode. When a large number of UEs need to be scheduled in one subframe, the control channel capacity may be limited. In this case, the network may use the fall-back transmission to alleviate the control channel constraint.

The network may need to switch a UB from its present transmission mode to a different transmission mode through Radio Resource Control (RRC). During the switching period, fallback is used to maintain the UE's connection to the wireless network until mode switching is successfully finished by RRC reconfiguration.

The wireless channel condition may experience fluctuations, particularly when a UE moves quickly or is surrounded by high-rise buildings that cause large signal penetration loss. The channel quality deterioration may be large enough so that the network is unsure if the UE can reliably receive its normal data and control channel DCI format. In this case, the network will fall-back to the more robust single-layer TxD-based transmission scheme to ensure that downlink connection to the UE is not lost. Similarly, such that the DCI format of the configured transmission mode may not be received reliably due to channel quality deterioration. Since fall-back uses a smaller-size DCI format and uses robust single-layer transmission scheme for downlink data, it ensures robust reception of the control channel.

When a CoMP UE receives a fall-back scheduling on DCI 1A, it needs to know the CRS REs for PDSCH rate-matching. However, current fall-back DCI format 1A assumes single-cell mapping. Accordingly, it carries no information regarding the CRS for PDSCH rate-matching. In one embodiment, when a UE configured in DL CoMP receives a fall-back transmission, PDSCH is rate-matched around the serving cell CRS. This may correspond to a scenario where downlink PDSCH data is transmitted by the serving cell 101 or by another cell 102-104 whose CRS pattern is a subset of the CRS pattern of the serving cell 101. Alternatively, when a UE configured in DL CoMP receives a fall-back transmission, PDSCH is rate-matched around one of the CRS RE set indicated by RRC higher layer signaling. For example, PDSCH may be rate-matched around the $1^{st}$ RRC higher layer configured CRS RE set, corresponding to the "00" field in Table 1. This is applicable to the scenario of semi-static point selection, for example, where codepoint "00" field in Table 1 is configured by the network to correspond to a cell (e.g., 102) other than the serving cell 101.

Reception Timing for CoMP.

Reception timing is an important factor to be considered in CoMP operation. In an OFDM system, the downlink timing of the PDSCH data transmission needs to be known at UE 105 in order to perform correct Fast Fourier Transform (FFT) processing and removal of Cyclic Prefix (CP). UE obtains initial timing acquisition to the serving cell 101 through the PSS/SSS, and tracks the downlink timing of serving cell 101 by the CRS or CSI-RS of the serving cell 101. In single-cell transmission, the UE 105 usually muses the timing of its downlink reference signals (CRS or CSI-RS) for PDSCH demodulation and does not perform a separate timing estimation on PDSCH. This reduces UE 105 complexity and would work perfectly in single-cell transmission because the PDSCH data and reference signals (CRS or CSI-RS) are originated from the same base station.

For multi-point transmission, in a particular subframe the UE may receive downlink PDSCH data from a cell 102-104 other than its serving cell 101. Because the propagation delay from different transmission points 101-104 may be different, UE can no longer reuse the downlink timing of cell 101 when receiving PDSCH data from another cell 102-104. The exact timing for PDSCH reception needs to be signaled to UE 105. In one embodiment, the higher layer may configure a set of timing assumptions, and dynamically indicates one timing assumption to the UE 105. Such dynamic signaling could reuse that of the CRS pattern signaling. For example, the CRS RE signaling and the timing signaling may be jointly encoded in the DCI format. Such a timing assumption could be either associated with the CRS or to one of the N configured CSI-RS resources in the CSI-RS measurement set. Table 2 illustrates an example table of PDSCH rate-matching and timing assumptions for a two-bit CRS RE signaling field in DCI format.

TABLE 2

| CRS RE signaling in DCI format | UE assumption on PDSCH rate-matching | UE assumption on PDSCH timing field |
|---|---|---|
| 00 | PDSCH rate-matching around the $1^{st}$ set of CRS REs configured by higher layer | PDSCH timing uses that of the $1^{st}$ CSI-RS resource in CoMP measurement set |
| 01 | PDSCH rate-matching around the $2^{nd}$ set of CRS REs configured by higher layer | PDSCH timing uses that of the $2^{nd}$ CSI-RS resource in CoMP measurement set |
| 10 | PDSCH rate-matching around the $3^{rd}$ set of CRS REs configured by higher layer | PDSCH timing uses that of the $3^{rd}$ CSI-RS resource in CoMP measurement set |
| 11 | PDSCH rate-matching around the $4^{th}$ set of CRS REs configured by higher layer | PDSCH timing uses that of the $4^{th}$ CSI-RS resource in CoMP measurement set |

When a CoMP UE receives a fall-back scheduling on DCI 1A, the UB needs to know the timing for PDSCH demodulation. However, the current fallback DCI format 1A carries no timing information. In one embodiment, when a UE configured in DL CoMP receives a fall-back transmission, PDSCH timing uses the timing of the serving cell CRS. Alternatively, when a UE configured in DL CoMP receives a fall-back transmission, PDSCH timing uses one of the timing assumptions indicated by RRC-higher layer signaling. For example, PDSCH timing follows that of the $1^{st}$ RRC higher layer configured timing assumption, corresponding to the "00" field in Table 2.

FIG. 3 is a high level block diagram of a system 300 that may be used as an eNB or UE, which may be, for example, eNBs 101-104 or UE 105 in FIG. 1. System 300 receives data to be transmitted from an interface 301 at transmit processor 302. The data may include, for example, audio or video information or other data file information to be transmitted on a PUSCH. The transmit processor 302 may also receive control information to be transmitted on a PUSCH from a controller 303. Transmit processor 302 processes (e.g., encode and symbol map) the data and control information to obtain data symbols, control symbols, and reference symbols. The transmit processor 302 may also perform spatial processing or precoding on the data symbols and/or the control symbols and reference symbols. The output of the transmit processor 302 is provided to a modem 304. Modem 304 processes the output symbol stream from the transmit processor 302 to obtain an output sample stream that is further processed by converting to analog, amplifying, and upconverting before being transmitted via antenna 305. In other embodiments, multiple modems 304 may be used to support (MIMO) transmission on multiple antennas 305.

Signals are also received at system 300 on antenna 305 from other devices. The received signals are provided to modem 304 for demodulation. Modem 304 processes the signals by filtering, amplifying, downconverting, and/or digitizing, for example, to obtain input samples. For example, modem 304 may receive a fall-back transmission from a base station when the device 300 is a UE configured for downlink CoMP. Modem 304 or a receive processor 306 may further process the input samples to obtain received symbols. Receive processor 306 then processes the symbols by demodulating, deinterleaving, and/or decoding. For example, in response to the fall-back transmission, receive processor 305 may perform PDSCH demodulation assuming PDSCH rate-matching based upon a default CRS RE set. Receive processor 305 may further determine a value of a CRS RE signaling field in a DCI signal received from a base station. If no fall-back transmission is received, receive processor 305 may perform PDSCH demodulation assuming rate-matching based upon a CRS RE set corresponding to the value in the downlink control signal, wherein the value of the CRS RE signaling field in the DCI signal corresponds to a CRS RE set configured by a RRC higher layer. Otherwise, in response to the fall-back transmission, receive processor 305 may perform PDSCH demodulation assuming rate-matching based upon a default CRS RE set. The default CRS RE set may be selected from a serving base station CRS RE set, a first CRS RE set of a plurality of CRS RE sets configured by the RRC higher layer.

Receive processor 306 provides decoded data to interface 301 for use by the eNB or UE. Receive processor further provides decoded control information to controller 303. Controller 303 may direct the operation of system 300 in the eNB or UE, such as by adjusting timing and power levels. A memory 307 may store data and program codes for controller 303, transmit processor 302, and/or receive processor 306. Additional components, such as a scheduler 308 may schedule downlink and/or uplink data transmission on one or more component carriers by system 300 (e.g., in an eNB).

FIG. 4 is a flowchart illustrating a method for determining PDSCH rate-matching according to an example embodiment. In step 401, the UE determines a value of a CRS RE signaling field in a DCI signal received from a base station. In step 402, if no fall-back transmission is received, the UE performs PDSCH demodulation assuming rate-matching based upon a CRS RE set corresponding to the value in the downlink control signal.

In step 403, a fall-back transmission is received from a base station at a UE configured for downlink CoMP. In step 404, in response to the fall-back transmission, the UE performs PDSCH demodulation assuming PDSCH rate-matching based upon a default CRS RE set. The fall-back transmission may be on a compact DCI format, such as fall-back scheduling on a DCI 1A format. The default CRS RE set may be a serving base station CRS RE set or a first CRS RE set of a plurality of CRS RE sets configured by a RRC higher layer. The value of the CRS RE signaling field in the DCI signal may correspond to a CRS RE set configured by a RRC higher layer, for example.

FIG. 5 is a flowchart illustrating a method for determining PDSCH timing according to another example embodiment. In step 501, the UE determines a value of a CRS RE signaling field in a DCI signal received from a base station. In step 502, if no fall-back transmission is received, the UE performs PDSCH demodulation using downlink timing for a CSI-RS resource corresponding to the value in the downlink control signal.

In step 503, a fall-back transmission is received from a base station at a UE configured for downlink CoMP. In step 504, in response to the fall-back transmission, the UE performs PDSCH demodulation using a default PDSCH timing assumption. The default PDSCH timing may be timing for a default CRS RE set or a CSI-RS resource. Alternatively, the default PDSCH timing may be timing of a serving base station CRS or a first CSI-RS resource of a plurality of CSI-RS resources configured by a RRC higher layer. The fall-back transmission may be on a compact DCI format, such as fall-back scheduling on a DCI 1A format.

Alternatively, in step 505, in response to the fall-back transmission, the UE performs PDSCH demodulation using downlink timing for a default CRS RE set or a first CSI-RS resource of a plurality of CSI-RS resources configured by a RRC higher layer. The default CRS RE set may be a serving cell CRS. The value of the CSI-RS resource signaling field in the DCI signal may correspond to a CSI-RS resource configured by the RRC higher layer.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method comprising:
   configuring a user equipment (UE) in a transmission mode that allows for reception of two or more Channel State Information Reference Signal (CSI-RS) resources;
   receiving, at the UE, first downlink control information (DCI) according to a first DCI format while operating in the configured transmission mode, wherein the first DCI format includes a two-bit field indicative of one out of four sets of cell-specific reference signal resource elements (CRS REs), each of the four sets of CRS REs being configured by radio resource control (RRC) signaling;
   in response to receiving the first DCI, determining by the UE a first set of CRS REs used for physical downlink shared channel (PDSCH) rate-matching based on the two-bit field included in the first DCI;
   demodulating a PDSCH corresponding to the first DCI based on the first set of CRS REs;

receiving, at the UE, second DCI according to DCI format 1A while operating in the configured transmission mode;

in response to receiving the second DCI, determining by the UE a second set of CRS REs used for PDSCH rate-matching based on the set of CRS REs corresponding to a value of "00" in the two-bit field; and demodulating a PDSCH corresponding to the second DCI based on the second set of CRS REs.

2. A user equipment (UE) comprising circuitry configured to:

configure the UE in a transmission mode that allows for reception of two or more Channel State Information Reference Signal (CSI-RS) resources;

receive first downlink control information (DCI) according to a first DCI format while operating in the configured transmission mode, wherein the first DCI format includes a two-bit field indicative of one out of four sets of cell-specific reference signal resource elements (CRS REs), each of the four sets of CRS REs being configured by higher layer radio resource control (RRC) signaling;

in response to receiving the first DCI, determine a first set of CRS REs used for physical downlink shared channel (PDSCH) rate-matching based on the two-bit field included in the first DCI;

demodulate a PDSCH corresponding to the first DCI based on the first set of CRS REs;

receive second DCI according to DCI format 1A while operating in the configured transmission mode;

in response to receiving the second DCI, determine a second set of CRS REs used for PDSCH rate-matching based on the set of CRS REs corresponding to a value of "00" in the two-bit field; and demodulate a PDSCH corresponding to the second DCI based on the second set of CRS REs.

* * * * *